United States Patent [19]
Harris

[11] Patent Number: 6,063,175
[45] Date of Patent: May 16, 2000

[54] TRIPHENYLMETHANE POLYMERIC COLORANT HAVING STERICALLY HINDERED AMINE COUNTER ION

[75] Inventor: Philip G. Harris, Spartanburg, S.C.

[73] Assignee: Milliken & Company, Spartanburg, S.C.

[21] Appl. No.: 09/024,208

[22] Filed: Feb. 17, 1998

[51] Int. Cl.$^7$ .................................................. C09D 11/02
[52] U.S. Cl. ..................................... 106/31.43; 106/31.27; 106/31.28
[58] Field of Search .............................. 106/31.43, 31.27, 106/31.28

[56] References Cited

U.S. PATENT DOCUMENTS

| | | | |
|---|---|---|---|
| 3,157,633 | 11/1964 | Kuhn | 260/200 |
| 4,167,510 | 9/1979 | Brendle | 260/174 |
| 4,871,371 | 10/1989 | Harris | 8/403 |
| 5,043,013 | 8/1991 | Kluger et al. | 106/31.43 |
| 5,059,244 | 10/1991 | King et al. | 106/31.43 |
| 5,066,758 | 11/1991 | Hönel et al. | 528/45 |
| 5,310,887 | 5/1994 | Moore et al. | 534/729 |
| 5,534,052 | 7/1996 | Mennicke et al. | 106/22 |
| 5,609,983 | 3/1997 | Kawamura et al. | 430/193 |
| 5,919,846 | 7/1999 | Batlaw et al. | 106/31.43 |

OTHER PUBLICATIONS

Billmeyer, et al., *Principles of Color Technology*, 2nd Edition, John Wiley & Sons, pp. 62–64 and 102–04 (1981), no month available.

*Primary Examiner*—Helene Klemanski
*Attorney, Agent, or Firm*—Terry T. Moyer; William S. Parks

[57] ABSTRACT

Novel triphenylmethane dyes or colorants with sterically hindered fugitive amine counter ions are provided as durable, storage-stable, and excellent coloring and shading printing inks. Ink compositions are disclosed which provide improvements in long-term storage capabilities, particularly within alkaline environments, extremely effective colorations of cellulose-based substrates, and lower cost over those of the prior art. The preferred dyes or colorants are triphenylmethane polymeric colorants which are capped with cyclic anhydride and the preferred sterically hindered amine counter ions are those based on low molecular weight fugitive tertiary amines, such as N,N-dimethylethanolamine. Compositions comprising water soluble or emulsion resins as diluents for lowered viscosity and lower overall cost are also contemplated. Furthermore, compositions comprising the inventive colorant and other pigments, dyes, surfactants, preservatives, and other colorants are contemplated. A method of making such an inventive ink composition and a cellulose-based substrate contacted with such an inventive ink composition are also disclosed.

10 Claims, No Drawings

TRIPHENYLMETHANE POLYMERIC COLORANT HAVING STERICALLY HINDERED AMINE COUNTER ION

FIELD OF THE INVENTION

This invention relates to triphenylmethane compounds for aqueous ink formulations which are storage stable for prolonged periods of time under alkaline conditions. Preferably, these compounds are either dyestuffs or polymeric colorants. Methods of making and using such aqueous inks are also contemplated within this invention.

DISCUSSION OF THE PRIOR ART

Triphenylmethane chromophore-based inks, particularly those dyes or colorants capped with cyclic anhydride, are well known for their excellent ability for coloring and shading within the printing industry. Problems exist, however, during the storage of such triphenylmethanes. Upon contact with an alkaline storage environments, chemical rearrangement may occur rendering undesirable shades. For instance, with triphenylmethane colorants, this degradation of color apparently occurs due to the presence of terminal carboxylic anions of a polymeric chromophore neutralized with hydroxide, ammonia, ethanolamine, diethanolamine, or other unhindered amines. This degradation of color results in very short storage time or requires refrigerated storage, all of which increases the costs associated with colorant storage. An improved cost-effective method of storing such colorants with substantially no shade degradation is thus necessary within the printing industry.

Triphenylmethane dyes and colorants, and, again, particularly those which are capped with cyclic anhydride, are well known within the printing industry and have been taught within U.S. Pat. No. 4,871,371, to Harris, and U.S. Pat. No. 5,310,887, to Moore et al., the disclosures of which are herein entirely incorporated by reference. Such compounds, as noted above, must undergo neutralization of their terminal carboxylic acids with a counter ion in order to provide solubility within an aqueous medium. Again, the problem with such a step is the degradation of suitable printing shades after reaction with common alkaline counter ions. It is believed that this undesired reaction is the result of interference from the primary or secondary amine moieties of the counter ion (neutralizing compound), such as diethanolamine, monoethanolamine, and the like, for example, or the strong nucleophilicity of alkali metal hydroxide ions, alkaline earth metal hydroxide ions, ammonium ions, and zinc ammonium complexes, or the resultant carboxylates of these ions and complexes, all being present in stoichiometric proportions, when used as such a counter ion. Thus, again, there is a need to provide a relatively inexpensive storage stable aqueous ink composition comprising triphenylmethane polymeric colorants, including cyclic anhydride capped colorants. The prior art has not accorded such an improvement to the printing industry.

DESCRIPTION OF THE INVENTION

It is thus an object of the invention to provide an improved aqueous ink composition comprising triphenylmethane dyes or colorants. A further object of the invention is to provide a relatively inexpensive, improved, storage-stable particularly under alkaline conditions) triphenylmethane-based polymeric colorant for the printing industry. Another object of the invention is to provide a printing ink having pleasing coloring and shading characteristics and having substantially no color degradation after a prolonged storage period, particularly under standard alkaline conditions. Yet another object of this invention is to provide a process for making such an improved coloring composition, as well as a method of using such a triphenylmethane polymeric colorant for printing cellulose-based writing surfaces, particularly newspapers, commercial inserts, folding cartons, household paper products, multiwall paper bags, and corrugated containers, merely as examples. One further object is to provide an improved long-lasting storage-stable aqueous printing ink composition comprising cyclic anhydride-capped triphenylmethane polymeric colorants and methods of making and using such a composition.

Accordingly, this invention concerns an aqueous ink composition comprising a triphenylmethane dye or colorant neutralized with a sterically hinderd amine counter ion. Preferably, the triphenylmethane compound is a polymeric colorant containing carboxylic acid groups neutralized with a sterically hindered amine counter ion. The term polymeric is meant to include those colorants which have alkylene oxide chains reacted with cyclic anhydrides and attached to nucleophilic groups bonded to the triphenylmethane backbone. The preferred alkylene oxides are ethylene oxide, propylene oxide, and butylene oxide, and any mixtures thereof. Ethylene oxide provides greater degrees water solubility for the colorant. Lower levels of such solubility are possible with greater numbers of longer chain alkylene oxide moieties. Preferred nucleophilic bridging groups include amino, hydroxyl, thio, or any other well known bridging group for alkylene oxides to a chromophore, such as those listed within U.S. Pat. No. 5,310,887. Preferred cyclic anhydrides are those ranging in chain length from about $C_2$ to about $C_{30}$.

The sterically hindered amine is one of a low molecular weight fugitive tertiary amine. The tertiary structure of the amine counter ion decreases its ability to act as a strong nucleophilic agent attacking any reactive centers of the chromophore. This fugitive tertiary amine is generally selected from the group consisting of one or more of di($C_1$–$C_{10}$-alkyl)ethanolamine. Examples of such amines include and are preferably N,N-dimethylethanolamine, N,N-diethylethanolamine, N,N-dipropylethanolamine, N-methyl-N-ethylethanolamine, N-methyl-N-propylethanolamine, and the like. This list is not meant to limit the invention in any way as any number of other low molecular weight fugitive sterically hindered amines may be suitable as counter ions. The low molecular weight and fugitivity requirement for such a tertiary amine counter ion facilitates its evaporation upon utilization in a standard printing method. In order to produce water fast colors on a cellulose-based substrate (i.e., paper), the triphenylmethane polymeric colorants must be effectively free of their counter ions. The term fugitivity means the removal of amine counter ion which is accomplished through evaporation upon long-term presence within a dry environment, through neutralization of the amine on the cellulose-based substrate itself (i.e., paper surfaces are generally acidic due to the presence of alum), or through the migration of the counter ion within the paper substrate. The removal of counter ion is accomplished through any of these three processes. Nowhere within the prior art is such a sterically hindered amine counter ion either taught or fairly suggested as a manner to reduce the effect of alkaline degradation upon the coloring and shading ability of a triphenylmethane polymeric colorant.

Any triphenylmethane dye or colorant is contemplated within this invention; however, the preferred types are those which are polymeric colorants and capped with cyclic anhydride. Particularly preferred cyclic anhydride capped triphenylmethane polymeric colorants are taught within U.S. Pat. No. 5,310,887, to Moore et al., mentioned above, and are represented by the formula:

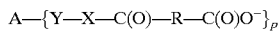

wherein A is a triphenylmethane organic chromophore; Y is a polyoxyalkylene substituent; X is a radical of a reactive hydroxyl, amino, or thio group; R is $C_{2-30}$, substituted or unsubstituted alkylene, alkyenylene, or phenylenealkylene; and p is from 1 to 4, and preferably 4. In general, when in aqueous composition, the sterically hindered fugitive amine counter ion is present in an amount of from about 0.01 to about 15% by parts of the entire amount of the triphenylmethane dye or colorant within the composition; preferably this amount is from about 1 to about 12%; more preferably from about 4 to about 8%; and most preferably from about 5 to about 7%.

Any other standard ink composition additives, such as resins, preservatives, other colorants, dyes, pigments, surfactants, and antistatic compounds may also be incorporated within the inventive composition or utilized within the inventive method. In fact, it is preferred that the inventive ink compositions include at least one additive selected from the group consisting essentially of a pigment, a surfactant, a preservative, an antistatic compound, another dye, and another colorant (that is, other than the inventive triphenylmethane dye or colorant), and any mixtures thereof. The inventive dye or colorant may provide a supplement to other pigments, dyes, and colorants, in order to produce excellent reproductions of photographs, pictures, and the like, on paper substrates. The optional pigments, other dyes, and other colorants may be of any suitable class, including anionic dyes, reactive dyes, and the like, and compounds comprising at least one of the following substituent groups: azo, including polyazo, diphenylmethane, triarylmethane, xanthene, methine, including polymethine, acridine, quinoline, thiazole, indamine, indophenol, azine, oxazine, thiazine, anthraquinone, indigoid and phthalocyanine, further including poly(oxyalkylene) derivatives of the above-listed compounds. The optional surfactants may be those well known in the art as anionic, cationic, amphoteric, and zwitterionic in nature. Optional preservatives include any well known examples of such compounds within ink compositions, such as Nuosept® 95, manufactured by Huls America, and Kathon® GC/ICP, manufactured by Rohm and Haas.

Particularly desired as optional additives are water solution or emulsion resins which are present to adjust the viscosity of and to increase the film strength of the ultimate ink formulations. Such resins include acrylics, acrylic latexes, proteins, and urethanes. Of limited use due to their low degree of water solubility, but feasible as resins for this composition, are carboxylated acrylics, polyvinyl alcohol, hydroxyethyl cellulose, and polyvinyl pyrrolidone. These resins are preferably acrylic in nature and comprise from 0 to about 40% of the entire ink composition. Particularly preferred acrylic resins are acrylic solution resins, such as Joncryl® 60, manufactured by S.C. Johnson & Son, Inc., Morcryl® 132 and 150, manufactured by Morton International, Inc.; acrylic emulsion resins, such as Joncryl® 537, 540, 1954, SCX-2153, and SCX-2155, manufactured by S.C. Johnson & Son, Inc.; styrenated acrylic emulsion resins, such as Joncryl® 89 and 130, manufactured by S.C. Johnson & Son, Inc., Lucidene® 602, manufactured by Morton International, Inc., and Zinpol® 460, manufactured by B.F. Goodrich; acrylic colloid emulsion resins, such as Joncryl® 142 and SCX-646, manufactured by S.C. Johnson & Son, Inc.,; acrylic copolymer emulsion resins, such as NeoCryl® XA-590 and B-817, manufactured by ICI Resins; and polyester-styrene acrylic resins, such as Lucidene® 1500, manufactured by Morton International, Inc. The most preferred acrylic resin is Joncryl® 130, a styrenated acrylic emulsion manufactured by S.C. Johnson & Son, Inc., which increases water fastness. These resins are generally neutralized with ammonia to increase their aqueous solubility. Interestingly, this ammonia neutralization does not affect the stability and colorability of the inventive triphenylmethane product, and, in particular, does not affect the preferred polymeric colorant, upon association with the sterically hindered amine counter ion. Even after a long storage period (13 months) at elevated temperatures of about 100° F. and at pH levels of between 7.5 and 8.5, such resin-diluted water soluble ink compositions showed no loss of color or shade change. At a lower pH level (below 7.0), the colorant showed a neutralization of carboxylic acids, resulting in a loss of water solubility. At pH levels above 8.5, the esters formed by reaction of the alkylene oxide moieties and the cyclic anhydrides undergo hydrolysis, resulting in loss of waterfastness. Also with regard to the potential resin constituents of the inventive compositions are those which have a low viscosity to provide the most effective depth of color on the printing substrate. Preferably, the resin is present in an amount sufficient to provide an ink composition having a viscosity, as tested using a #2 Shell Cup, ranging from about 16 to about 26 seconds, and most preferably from about 22 seconds. This amount generally comprises from about 5 to about 40 wt % of the total ink composition. Also of great importance to this inventive composition is the utilization of softened or deionized water to dilute the thick liquid colorant before formulating an ink composition. Hard or tap water may contain calcium or other metal ions which may complex with the aforementioned resins, effectively increasing the overall viscosity of the composition.

DESCRIPTION OF THE PREFERRED EMBODIMENT

The preferred method of making the preferred inventive colorant is as follows:

Aniline was reacted with 2 moles of ethylene oxide followed by 13 moles of propylene oxide. The polyoxyalkylenated aniline derivative was condensed with o-formyl benzenesulfonic acid, oxidized, and washed to give a dark blue colorant, as is well known in the art. Water was then removed from the polymeric colorant by heating under vacuum to give 504 parts of dry material. To the dry blue colorant was added 276 parts of dodecenyl succinic anhydride and 4 parts of 1-methylimidazole (a catalyst). The mixture was heated to 190° F. with stirring and held at that temperature for three (3) hours. The heating was continued until the measured anhydride peak at $1880^{-cm}$ within the infrared spectrum had disappeared. The resultant composition was a thick blue liquid. To this viscous liquid was added 670 parts of demineralized water while stirring, followed by 72.5 parts of N,N-dimethylethanolamine. This resultant composition was equal to 1480 parts of a soluble dark blue polymeric triphenylmethane colorant. The colorant had a viscosity at 25° C. of 1540 cps (measured by a Brookfield DV-II viscometer at an RV spindle rate of 60 rpm) had a pH of 7.0, and had a color value of 16.53 (measured with a Beckmann DU7 UV visible spectrophotometer; abs/g/L in methanol) with $\lambda_{max}$ at 628 nm.

Samples of this colorant were then incorporated into a variety of different ink compositions for comparison tests, as described in greater detail below. Samples of each ink composition were stored in sealed glass vials in an oven at 122° F. Periodically, the ink samples were removed from the oven, allowed to cool to room temperature, and applied to a substrate. Specifically, each ink composition sample was drawn down with a Pamarco 360 cell count hand proofer, tool reference 155, on white printing grade newsprint purchased from Dillard paper, #VB595. Print densities for all of the samples were 1.0 on the density T scale. Print samples were analyzed with an Xrite® Model 938 Spectrodensitometer using CIELAB coordinates. The spectrodensitometer was adjusted to the following settings: 10 degree viewer, D65 illuminant, and 4 mm measuring diameter. The instrument was calibrated with a standard white tile.

The following examples are thus indicative of the preferred embodiments, both the compositions and methods, of this invention:

EXAMPLE 1

An ink composition was then produced by diluting the liquid colorant with an equal number of parts of deionized water and adjusting the pH with dimethylethanolamine (DMEA) to about 8.0. Subsequently added was about 148 parts of a styrenated acrylic emulsion resin, Joncryl® 130, and small amounts (about parts each) of biocide preservatives, Nuosept® 95, manufactured by Huls America, and Kathon® GC/ICP, manufactured by Rohm and Haas, as well as further amounts of deionized water and DMEA to obtain the correct 8.0 pH level. The overall viscosity of the ink composition, using a #2 Shell Cup, was about 22 seconds. (The use of deionized water is necessary to avoid an increase in viscosity due to complexing with calcium or other ions within hard, tap water. Also, any well known preservative is contemplated as an additive within the inventive composition.)

This ink composition was stored in a standard alkaline storage composition within a standard storage ink container for 13 months at a temperature of 122° F. Periodically, as well as after this prolonged period of time, the ink composition was tested utilizing the same basic paper marking test and showed no change in shade or loss of color from the initial test, the results of which are tabulated below.

EXAMPLE 2

An ink composition was produced by diluting the liquid colorant without the subsequent addition of a resin composition, in contrast to EXAMPLE 1. This composition also had a viscosity of about 22 seconds utilized a #2 Shell Cup test. The non-resin containing sample showed excellent coloring and shading in the paper draw down test. Upon 13 months of storage at a pH level of about 8.0 and at a temperature of about 122° F., the ink composition showed no loss in color or degradation of shade, again, through the same draw down test, the results of which are indicated below.

EXAMPLES 3–5 (Comparative)

Ink compositions were also produced by diluting the liquid colorant with an equal number of parts of deionized water and adjusting the pH with a variety of bases (counter ions), including aqueous ammonia (EXAMPLE 3), ethanolamine (EXAMPLE 4), and diethanolamine (EXAMPLE 5), to 8.0. The viscosity of each ink composition equaled about 22 seconds, measured with a #2 Shell Cup. Ink samples were drawn down using the same procedure and substrate as with EXAMPLEs 1 and 2, above.

All of the ink samples, including those produced in EXAMPLEs 1 and 2, were tested for their color stability after long storage periods in an oven. The color difference between the initial print and print from ink that was oven aged was calculated for each sample using the following equation:

$$\Delta E^* = ((L^*_{initial} - L^*_{aged})^2 + (a^*_{initial} - a^*_{aged})^2 + (b^*_{initial} - b^*_{aged})^2)^{1/2}$$

wherein $\Delta E^*$ represents the difference in color between the initial printed sample and the sample printed with oven aged ink. $L^*$, $a^*$, and $b^*$ are the color coordinates; wherein $L^*$ is a measure of the lightness and darkness of the print sample; $a^*$ is a measure of the redness or greenness of the print sample; and $b^*$ is a measure of the yellowness or blueness of the print sample. For a further discussion and explanation of this testing procedure, see Billmeyer, F. W., et al., *Principles of Color Technology*, 2nd Edition, pp. 62–64 and 101–04. The results for EXAMPLES 1–5 are presented in tabulated form below:

TABLE $\Delta E^*$ Calculations for EXAMPLES 1–5

| EXAMPLE #<br>Correlative To Neutralizing Base | $\Delta E^*$ for 3 Weeks<br>Storage at 122° F. | $\Delta E^*$ for 56 Weeks<br>Storage at 122° F. |
|---|---|---|
| 1 - Dimethylethanolamine in 10% acrylic resin | 0.91 | 1.61 |
| 2 - Dimethylethanolamine | 0.47 | 1.77 |
| 3 - Aqueous Ammonia | 20.64 | * |
| 4 - Ethanolamine | 5.67 | * |
| 5 - Diethanolamine | 6.27 | * |

*No $\Delta E^*$ could accurately be measured for these samples since the change in color through visual observation alone indicated a drastic alteration of color.

Clearly, the sterically hindered tertiary amine counter ions (neutralizing bases) provide the best stability for the triphenylmethane polymeric colorant, particularly over long-term, high temperature storage.

There are, of course, many alternative embodiments and modifications of the present invention which are intended to be included within the spirit and scope of the following claims.

What I claim is:

1. An aqueous ink composition comprising
   a coloring compound selected from the group consisting of a triphenylmethane dye, a triphenylmethane colorant, and any mixtures thereof, said compound or colorant having a sterically hindered fugitive amine counter ion;
   from 0 to 40 wt. % of a water soluble or emulsion resin; and
   optionally, at least one additive selected from the group consisting of a pigment, a dye, a surfactant, a preservative, another colorant, and any mixtures thereof.

2. The composition of claim 1 wherein
   said coloring compound is a triphenylmethane polymeric colorant; and
   said sterically hindered fugitive amine counter ion is selected from the group consisting of low molecular weight fugitive tertiary amines.

3. The composition of claim 2 wherein
   said tertiary amine is selected from the group consisting of one or more of di($C_1$–$C_{10}$-alkyl)ethanolamine.

4. The composition of claim 2 wherein said triphenylmethane polymeric colorant is cyclic anhydride capped.

5. The composition of claim 4 wherein said anhydride capped polymeric triphenylmethane colorant is represented by formula I:

$$A-\{Y-X-C(O)-R-C(O)O^-\}_p \qquad (I)$$

wherein A is a triphenylmethane organic chromophore; Y is a polyoxyalkylene substituent; X is a radical selected from the group of reactive groups consisting of hydroxyl, amino, and thio; R is a $C_{2\text{-}30}$ group selected from the group consisting of substituted or unsubstituted alkylene, alkyenylene, and phenylenealkylene; and p is 1–4.

6. The composition of claim 1 wherein said sterically hindered fugitive amine counter ion is present in an amount of from about 0.01 to about 15% in parts of the entire amount of the triphenylmethane dye or colorant.

7. The composition of claim 6 wherein said sterically hindered fugitive amine counter ion is present in an amount of from about 1 to about 12% in parts of the entire amount of the triphenylmethane dye or colorant.

8. The composition of claim 7 wherein said sterically hindered fugitive amine counter ion is present in an amount of from about 4 to about 8% in parts of the entire amount of the triphenylmethane dye or colorant.

9. The composition of claim 8 wherein said sterically hindered fugitive amine counter ion is present in an amount of from about 5 to about 7% in parts of the entire amount of the triphenylmethane dye or colorant.

10. The composition of claim 1 wherein said composition comprises a water soluble acrylic resin.

* * * * *